(12) United States Patent
Cornic et al.

(10) Patent No.: US 9,488,720 B2
(45) Date of Patent: Nov. 8, 2016

(54) ACTIVE AND PASSIVE ELECTROMAGNETIC DETECTION WITH A LOW PROBABILITY OF INTERCEPTION

(71) Applicant: THALES, Neuilly sur Seine (FR)

(72) Inventors: Pascal Cornic, Guilers (FR); Patrick Le Bihan, Lannilis (FR); Stephane Kemkemian, Elancourt (FR)

(73) Assignee: THALES, Courbevoie (FR)

( * ) Notice: Subject to any disclaimer, the term of this patent is extended or adjusted under 35 U.S.C. 154(b) by 240 days.

(21) Appl. No.: 14/389,508

(22) PCT Filed: Mar. 26, 2013

(86) PCT No.: PCT/EP2013/056406
§ 371 (c)(1),
(2) Date: Sep. 30, 2014

(87) PCT Pub. No.: WO2013/144146
PCT Pub. Date: Oct. 3, 2013

(65) Prior Publication Data
US 2015/0048965 A1   Feb. 19, 2015

(30) Foreign Application Priority Data
Mar. 30, 2012 (FR) .................................... 12 00967

(51) Int. Cl.
*G01S 7/35* (2006.01)
*G01S 3/46* (2006.01)
(Continued)

(52) U.S. Cl.
CPC .. *G01S 7/35* (2013.01); *G01S 3/14* (2013.01); *G01S 3/46* (2013.01); *G01S 3/74* (2013.01); *G01S 13/02* (2013.01); *G01S 2013/0281* (2013.01)

(58) Field of Classification Search
USPC .................................. 342/27, 145, 156, 189
See application file for complete search history.

(56) References Cited

U.S. PATENT DOCUMENTS

H000374 H * 11/1987 Abo-Zena ................. G01S 3/74
                                                                 342/378
5,339,284 A    8/1994 Kaiser
(Continued)

FOREIGN PATENT DOCUMENTS

EP         2144084 A2 *  1/2010  ............... G01S 3/46
EP         2296007 A1    3/2011
(Continued)

OTHER PUBLICATIONS

Jinli Chen, et al., "A New Method for Joint DOD and DOA Estimation in Bistatic MIMO Radar", Signal Processing, Feb. 1, 2010, pp. 714-718, vol. 90, No. 2, Elsevier Science Publishers B.V., Amsterdam, NL, XP026652535.
(Continued)

*Primary Examiner* — John B Sotomayor
(74) *Attorney, Agent, or Firm* — Baker & Hostetler LLP

(57) ABSTRACT

An active and passive detection device is provided with a low probability of interception having a fixed antenna structure, transmission means and reception means. The antenna structure is formed by a plurality of radiating elements grouped into identical subnetworks and comprises at least one transmission subnetwork and at least three reception subnetworks. The transmission means are capable of generating an unfocused continuous waveform having low peak power in one plane and of transmitting said waveform. The reception means are capable of detecting the targets following the formation of a plurality of directional beams on the basis of the signals received on the reception subnetworks. The reception means are likewise capable of implementing the interception of radar signals from other radar sources using cross correlation processing between the signals received on at least three reception subnetworks.

17 Claims, 14 Drawing Sheets

(51) Int. Cl.
  *G01S 3/74* (2006.01)
  *G01S 3/14* (2006.01)
  *G01S 13/02* (2006.01)

(56) References Cited

U.S. PATENT DOCUMENTS

| | | | | |
|---|---|---|---|---|
| 5,708,442 | A * | 1/1998 | Whelan | H01Q 21/29 342/194 |
| 6,738,563 | B1 * | 5/2004 | Hager | G01S 7/292 342/147 |
| 9,375,158 | B2 * | 6/2016 | Vakoc | A61B 5/0066 |
| 2004/0183712 | A1 * | 9/2004 | Levitan | F41H 13/00 342/22 |
| 2005/0219117 | A1 * | 10/2005 | Hiromori | G01S 7/4004 342/165 |
| 2007/0222667 | A1 * | 9/2007 | Burlet | G01S 3/48 342/120 |
| 2010/0033377 | A1 | 2/2010 | Straatveit | |
| 2010/0328157 | A1 | 12/2010 | Culkin et al. | |
| 2011/0187579 | A1 * | 8/2011 | Asada | G01S 13/30 342/27 |
| 2011/0221625 | A1 | 9/2011 | Cornic et al. | |
| 2012/0081247 | A1 | 4/2012 | Kemkemian et al. | |

FOREIGN PATENT DOCUMENTS

| | | | |
|---|---|---|---|
| EP | 2434310 A1 | 3/2012 | |
| WO | WO 0039601 A1 * | 7/2000 | G01S 3/08 |

OTHER PUBLICATIONS

Stephane Kemkemian, et al., "Toward Common Radar & EW Multifunction Active Arrays", 2010 IEEE International Symposium on Phased Array Systems and Technology, Oct. 12, 2010, pp. 777-784, IEEE, Piscataway, NJ, USA, XP031828584.

* cited by examiner

Sub networks selected for the passive detection function

ACTIVE AND PASSIVE ELECTROMAGNETIC DETECTION WITH A LOW PROBABILITY OF INTERCEPTION

CROSS-REFERENCE TO RELATED APPLICATIONS

This application is a National Stage of International patent application PCT/EP2013/056406, filed on Mar. 26, 2013, which claims priority to foreign French patent application No. FR 1200967, filed on Mar. 30, 2012, the disclosures of which are incorporated by reference in their entirety.

FIELD OF THE INVENTION

The present invention concerns the field of electromagnetic detection. More particularly, the present invention concerns an active and passive electromagnetic detection device with a low probability of interception. The present invention may be useful in terrestrial, maritime or air applications.

BACKGROUND

Radars with a low probability of interception or LPI— Low Probability of Intercept—are becoming more and more developed. It has been shown that these radars, although difficult to detect using conventional interceptors, can be detected by intel measurement systems specially dedicated to this end, for example by using an antenna having high rotational gain. There is therefore a need to strengthen the discretion of these so-called LPI radars so that they are as difficult as possible to detect.

Radar systems with a low probability of interception implementing a passive and active detection function using a rotating radar are known. Unfortunately, even if it is not possible to detect the passive interception function in principle, the system continues to be vulnerable if the radar can be detected when it is transmitting. Moreover, the rotating antennas make it necessary to use microwave rotary joints, which are generally critical components. Another disadvantage of rotating antennas is related to the noise generated by the rotation mechanisms of the antenna, which compromises the acoustic discretion of the radar. The transmission of very wideband digital and/or optical signals between the mobile part and the fixed part of the radar is likewise a problem.

Furthermore, when the environment does not allow the use of servomechanisms, such as when the system is intended to be mounted on a vehicle where there is a high risk of shocks, or when it is necessary to detect in a very short time, a system having a rotary directional antenna cannot be used, in view of the time required to sweep the whole of the angular field, typically a few seconds for 360°.

In general, LPI radars transmit pulses having low peak power in relation to classical pulse radars. Rather than transmitting pulses of short duration and high power, LPI radars have the special feature of distributing the power over time. They thus transmit pulses having low peak power but over a much longer time, and in the extreme case the transmission is continuous or quasi-continuous. A disadvantage of this transmission technique is that when it is used on its own it can be countered by detectors using, by way of example, processing that allows coherent integration of the signal over a long time, typically in the order of between one and a few tens of milliseconds.

Moreover, continuous wave radars have a major disadvantage, relating to the coupling between transmission and reception that are simultaneous, which tends to greatly limit the use of said radars when the range required is great, typically beyond between one and a few tens of kilometers.

SUMMARY OF THE INVENTION

An aim of the invention is notably to correct the aforementioned disadvantages by proposing a detection device allowing the performance of easily integratable active and passive detection that is robust toward the mechanical environment, and that has a very low probability of interception by adverse systems.

To this end, the subject of the invention is an active and passive electromagnetic detection device with a low probability of interception having a fixed antenna structure, transmission means and reception means,
 the antenna structure being formed by a plurality of radiating elements grouped into identical subnetworks and comprising at least one transmission subnetwork and at least three reception subnetworks that are separate from the transmission subnetworks,
 the transmission means being capable of generating an unfocused continuous or quasi-continuous waveform having low peak power in one plane and of transmitting this waveform via the transmission subnetwork(s),
 the reception means being capable of detecting the targets following formation of a plurality of directional beams on the basis of the signals received on the reception subnetworks of the antenna structure,
 the reception means being likewise capable of implementing the interception of radar signals from other radar sources using cross correlation processing between the signals received on at least three reception subnetworks.

According to one variant embodiment, the antenna structure comprises at least two transmission subnetworks and the transmission means are capable of generating signals having different frequency bands and of transmitting these signals on different transmission subnetworks.

According to another variant embodiment, the transmission means are capable of generating transmission signals of identical shape that are centered on different frequencies and occupy separate frequency bands.

According to another variant embodiment, the transmission signals are of continuous or quasi-continuous shape and frequency modulated.

According to another variant embodiment, the reception means are capable of demodulating the received signals using one of the transmission signals.

According to another variant embodiment, the reception means are capable of demodulating the received signals using one of the transmission signals following frequency transposition of said transmission signal.

According to another variant embodiment, the reception means are capable of separating the received signals, following demodulation, into reception subsignals using passband filtering, said filtering being performed as a function of the transmission signals.

According to another variant embodiment, the reception means are capable of coherently integrating the various reception signals with respect to time, the integration of each subsignal being performed separately.

According to another variant embodiment, the reception means are capable of integrating the reception subsignals with respect to space and coherently so as to form directional beams in one plane.

According to another variant embodiment, following coherent integration with respect to time and space, the reception means are capable of post-integration of the reception subsignals noncoherently throughout the time available for exploring the angular field to be covered.

According to another variant embodiment, the reception means are capable of detecting the potential targets in each beam formed following noncoherent post-integration.

According to another variant embodiment, the transmission means have means that are capable of adjusting the minimum transmitted power as a function of the instrumented range and the radar cross section to be detected.

According to another variant embodiment, the reception means are capable, in passive mode, of performing intercorrelation of the signals received on at least three reception subnetworks so as to detect and locate, in angular fashion, the potential transmission sources.

According to another variant embodiment, the reception means are capable of performing angular location of the potential radar transmission sources using phase interferometry, the reception subnetworks used forming at least a first, ambiguous interferometry base and a second, unambiguous interferometry base.

According to another variant embodiment, the interferometry bases are formed by three reception subnetworks, two being situated at each of the two ends of the antenna structure and the third being the neighbor closest to one of the two preceding reception subnetworks.

According to another variant embodiment, the reception means have selection means that are capable of selecting the subnetworks to be used for detection and location in differentiated fashion over the course of time so as to separate the received signals and remove the angular ambiguities in a dense electromagnetic environment.

According to another variant embodiment, the device comprises n antenna structures, where n>=3, each structure covering an angular field that is substantially equal to 360°/n and each structure being disposed on each of the lateral faces of a polyhedron having an n-sided polygonal base so as to cover an angular field that is substantially equal to 360°.

BRIEF DESCRIPTION OF THE DRAWINGS

Other special features and advantages of the present invention will emerge more clearly upon reading the description that follows, which is given by way of illustration without limitation and provided with reference to the annex thereto and to the appended drawings, in which.

annex 1 is a table of features of a conventional LPI radar and of that of a particular embodiment of a detection device according to the invention.

DETAILED DESCRIPTION

The solution proposed by the present invention consists in implementing, using the same hardware, an electromagnetic detection device that allows both an active and a passive interception function, with very high sensitivity, without a rotation mechanism and exhibiting a very low probability of interception by adverse systems. According to a preferred embodiment, the device covers an angular field of 360°.

Figure 1:
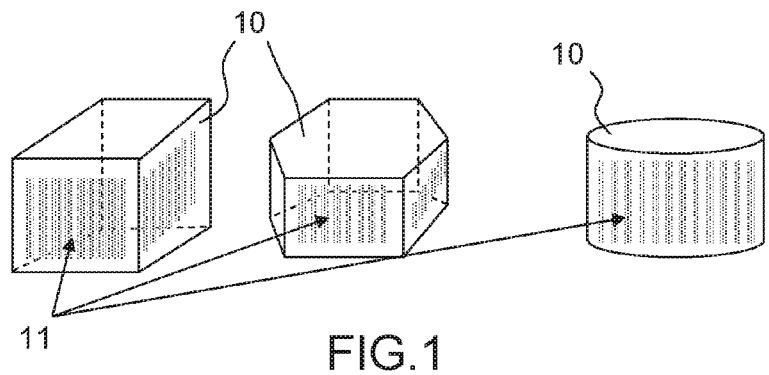
FIG. 1 shows various examples of embodiments of the device according to the invention.

FIG. 1 shows examples of embodiments of a detection device 1 according to the invention.

In a general manner, the detection device 1 has the shape of a polyhedron, the base of which is an n-sided polygon (n≥1). The device comprises n antenna structures 10 formed by a plurality of radiating elements grouped into subnetworks 11. In order to cover an angular field of 360° in azimuth, each antenna structure will be able to have an angular coverage of 360°/n in azimuth.

The device 1 may likewise have a cylindrical or oval base or any other possible shape.

The antenna structures 10 may be planar or conformal networks so as to fit the shapes of the detection device, such as a cylinder or a cone.

Figure 2A:
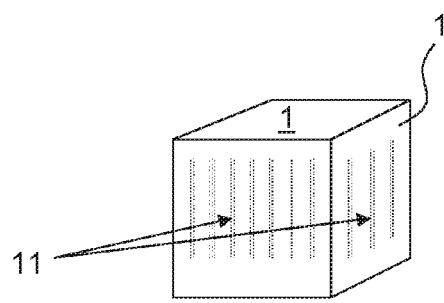
FIG. 2 shows examples of preferred embodiments of the device according to the invention.
Figure 2B:
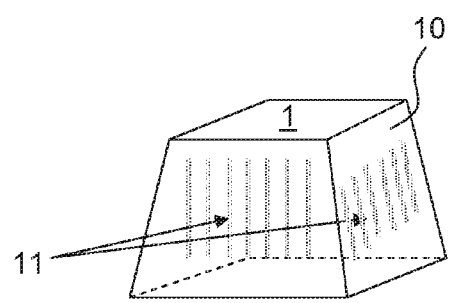

FIG. 2 shows preferred embodiments. The preferred shapes for the implementation of the detection device 1 are a cube and a truncated pyramid with a square base. The four lateral faces of the device are each covered by a planar antenna network 10 covering an angular field of approximately 90° in azimuth, and from a few degrees to a few tens of degrees in elevation. So as to cover an angular field of 360° in azimuth, the four antenna structures 10 can be activated successively or simultaneously.

Figure 2C:
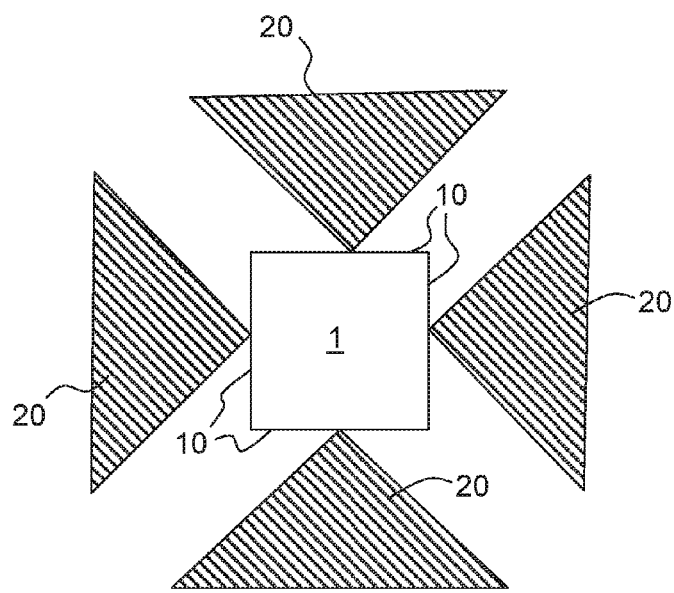

FIG. 2c shows a top view of a preferred embodiment showing the fields of coverage 20 of each antenna structure 10 and therefore the total angular coverage in azimuth of the device according to the invention.

Figure 3:
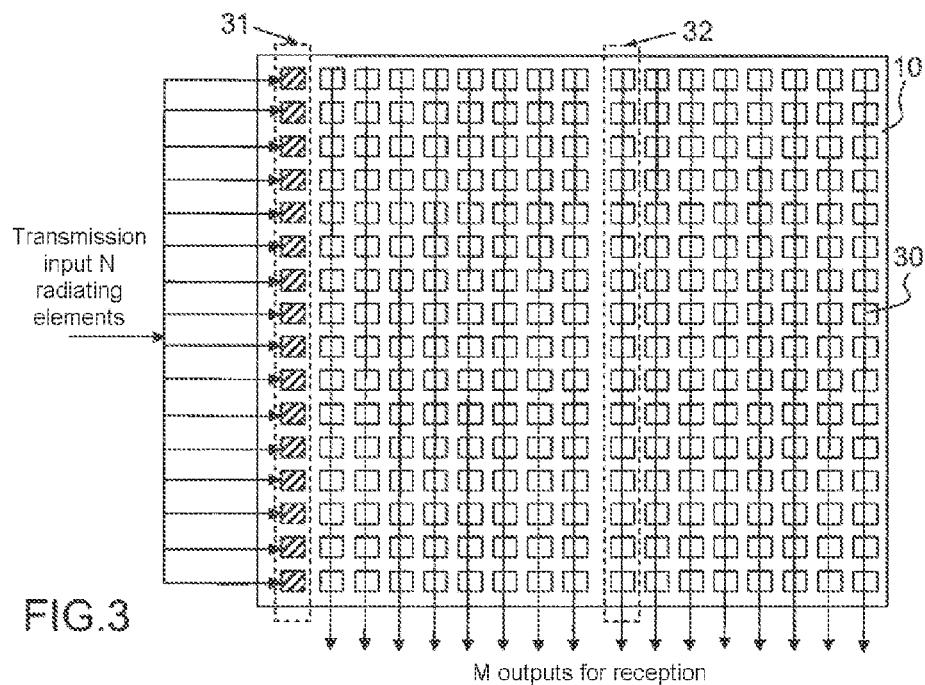
FIG. 3 shows an exemplary embodiment of an antenna structure having K inputs and M outputs.

FIG. 3 shows an exemplary embodiment of an antenna structure 10 according to the invention. The structure shown is the simplest embodiment. The antenna structure comprises a vertical transmission network 31 corresponding to a column of N identical radiating elements 30 spaced apart by a distance equal to half the wavelength. Each radiating element of a transmission subnetwork 31 is supplied in phase with the same transmission signal. The same antenna structure likewise has M vertical reception subnetworks 32 arranged on it, each comprising N identical radiating elements 30 connected to one another and separated by $\lambda/2$.

In this embodiment, the transmission 31 and the reception 32 subnetworks have the same number of radiating elements 30. This is in no way limiting. In other embodiments, these two types of subnetworks may have different numbers of radiating elements 30.

Assuming that the N radiating elements 30 are spaced by $\lambda/2$ in the two planes, the directionality of the beam for transmission is typically 90° in azimuth and $360/N\pi$ in elevation, and $360/M\pi$ in azimuth and for reception $360/N\pi$ in elevation, after formation of the beam.

Figure 4:
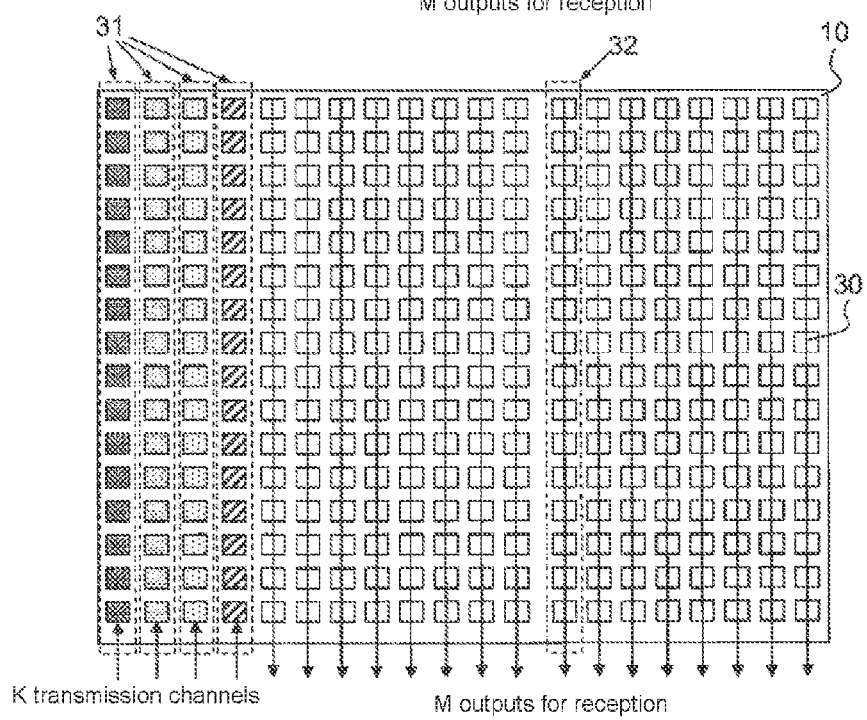
FIG. 4 shows an exemplary embodiment of an antenna structure according to the invention.

FIG. 4 shows an embodiment in which the antenna structure has K transmission subnetworks 31 and M reception subnetworks 32. Each transmission subnetwork 31 is supplied with a different transmission signal and forms a transmission channel. The various transmission signals are orthogonal with respect to one another.

The antenna structure 10 shown corresponds to a network having K inputs and M outputs. This structure is also known by the name MIMO for multiple input multiple output.

If the K transmission subnetworks are supplied with K mutually orthogonal signals at power p, the total power radiated by the antenna structure is equal to K·p and the energy transmitted is distributed in the field of angular coverage of the elementary radiating element, typically 90° in azimuth and $(\lambda/2N)\cdot 180/\pi$ in elevation. If the elementary length of a radiating element $L_e$ is considered to be equal to the half-wavelength, the antenna gain for transmission is then, for each transmission subnetwork:

$$G_e = \frac{4\pi S_e}{\lambda^2} = \frac{4\pi H_e L_e}{\lambda^2} = \frac{4\pi N \lambda L_e}{2\lambda^2} = \frac{2\pi N L_e}{\lambda} = \pi N$$

where:
  $G_e$: transmission antenna gain,
  $S_e$: transmission antenna surface area,
  $H_e$ transmission antenna height,
  $L_e$: transmission antenna length,
  $\lambda$: wavelength of the transmission signal.

Moreover, if the K transmission signals respectively occupy separate instantaneous bands of width $\Delta F$, the total instantaneous radiated power is distributed in a total band of width $K\cdot\Delta F$.

Under these conditions, let us suppose that an ESM, for "Electronic Support Measure", detection device detects the signal transmitted by the detection device 1 according to the invention. If the ESM reception band is perfectly conditioned to the instantaneous transmission band of width $\Delta F$ for the radar signal, the ESM detection device will pick up a power p simultaneously in K reception filters of band $\Delta F$.

If the K transmission signals were contained in the same frequency band of width $\Delta F$, the ESM detection device would have picked up a power equal to K·p in a single reception filter.

The spectral spreading of the transmission signal from the device 1 according to the invention allows the power picked up by an ESM device to be reduced by a factor K and therefore the discretion of the radar to be increased. The "discretion gain" of the radar signal thus obtained by spectral spreading is equal to K.

Moreover, the equivalent isotropically radiated power (EIRP) can be obtained using the formula:

$$\text{EIRP}_1 = KN\pi p$$

It will be noted that the equivalent isotropic power that would be radiated by the same antenna if the K transmission subnetworks transmitted the same signal would be:

$$\text{EIRP}_2 = K^2 N\pi p = K\cdot\text{EIRP}_1$$

The "relative discretion gain" of the radar signal thus obtained by defocusing on transmission would in this case be equal to K and the overall discretion gain would be equal to $K^2$.

Figure 5:
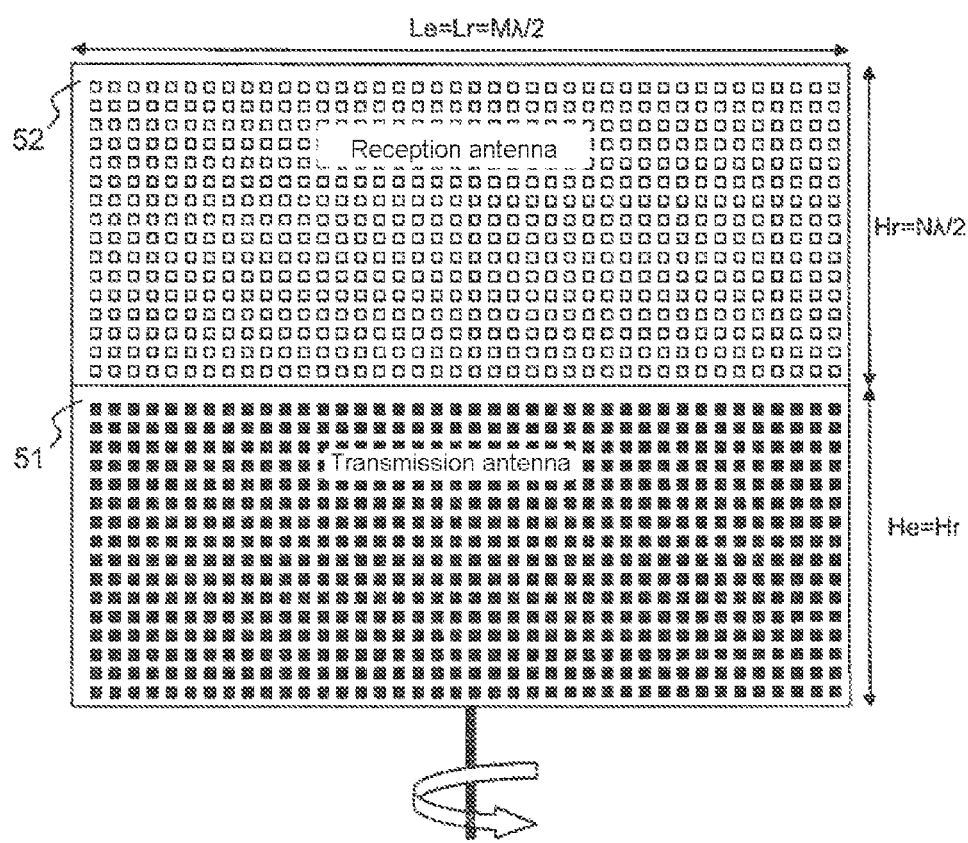
FIG. 5 shows an exemplary embodiment of a conventional LPI radar.
Figure 6:
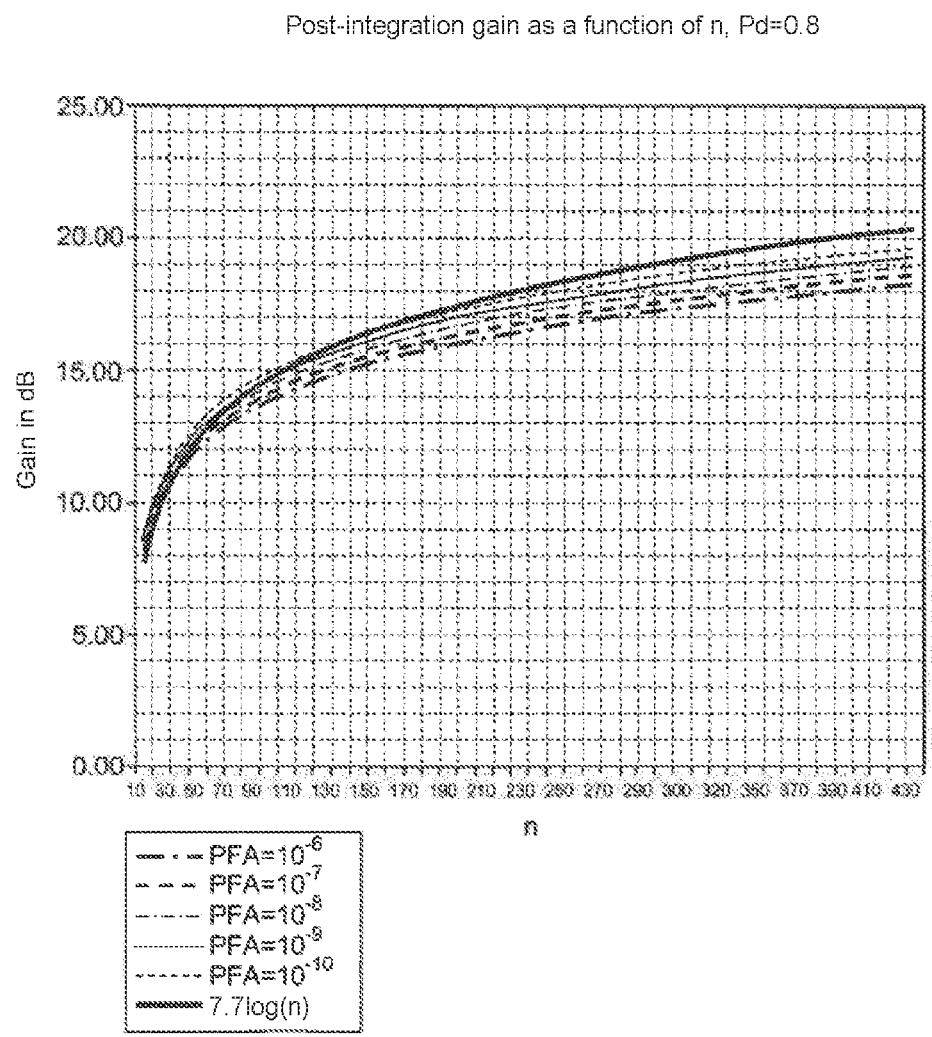
FIG. 6 shows curves for post-integration gain as a function of the integration number.
Figure 7:
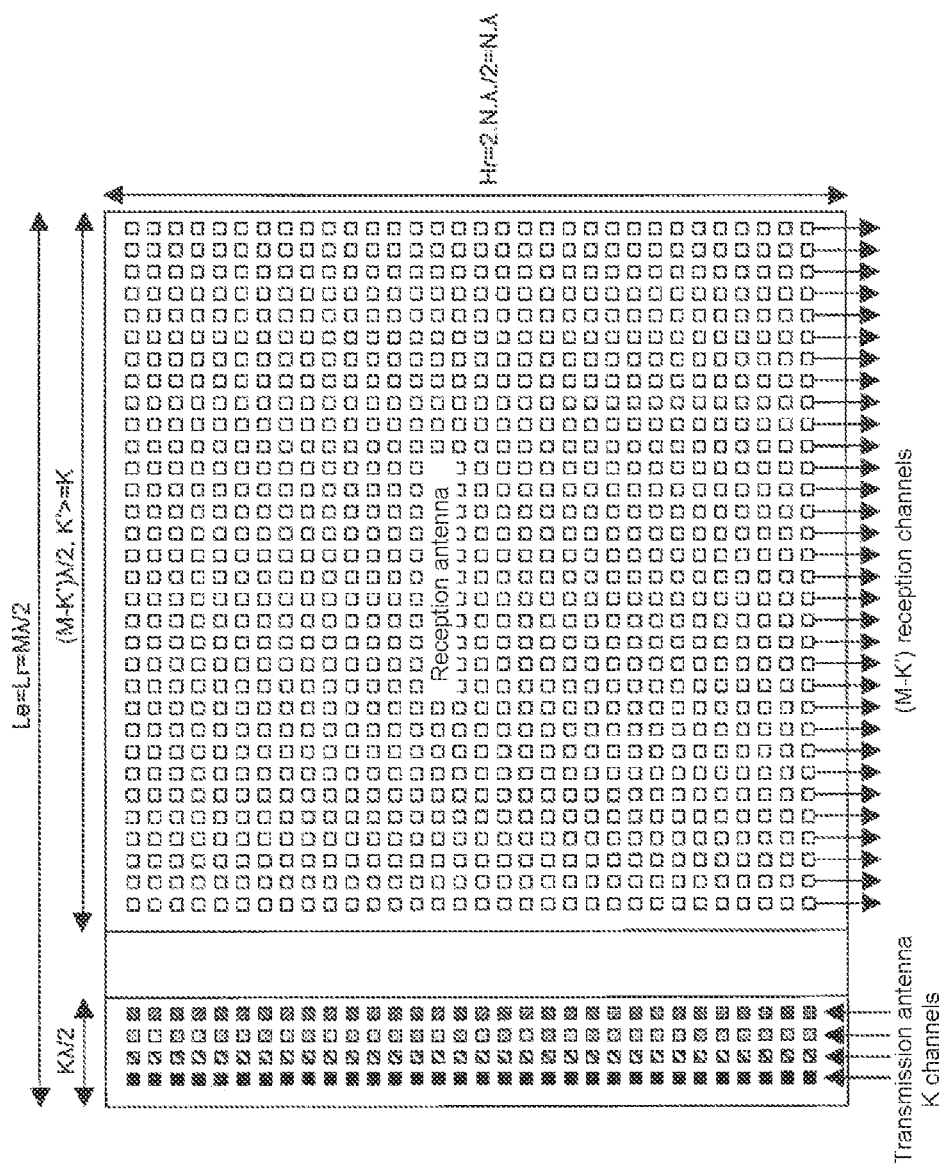
FIG. 7 shows an example of arrangement of the antenna structure according to the invention.

With reference to FIGS. 5 to 7, the performance levels of the electromagnetic detection device 1 below, in radar mode, will be compared with those of a classical LPI radar using narrow beam continuous waves exhibiting the same antenna surface area, with mechanical or electronic scanning in azimuth.

For reasons of implementation simplicity, an LPI radar preferably uses a periodic waveform made up of frequency ramps. The period is generally in the order of between a few hundreds of microseconds and a few milliseconds.

FIG. 5 shows an exemplary embodiment of a conventional continuous wave LPI radar.

In the description that follows, a frequency modulated continuous waveform or FMCW, for frequency modulated continuous wave, will be considered. This is in no way limiting, and other types of modulation are possible, such as phase code modulation, frequency modulation or FSK (Frequency Shift Keying).

For decoupling reasons, a continuous wave LPI radar of this kind comprises two separate transmission 51 and reception 52 antennas, which are superimposed, for example. These antennas are generally directional in the two planes and exhibit an unweighted angular aperture:

In azimuth: $\theta_{g3db} = \lambda/L_e = 2/M$ (radians)

In elevation: $\theta_{e3db} = \lambda/H_e = 2/N$ (radians)

They exhibit a gain for transmission $G_e = G_r = 4\pi S/\lambda^2$.

Assuming a field of angular coverage $\Omega = \Omega_e \Omega\cdot\Omega_g$ and an exploration time for the field Tex, the time for which the target is present in the antenna lobe is $$T_e = T_{ex}\theta_{g3db}\theta_{e3db}/\Omega$$

The conditioned radar processing involves integrating the signal received coherently, over a time $T_c$ limited by the coherency time of the target, typically in the order of 50 ms, and then performing post-integration of the amplitude of the signal over a time $T_{nc}$ that is limited by the time for which the target is present in the beam $$T_{nc} = (T_{ex}\theta_{g3db}/\Omega_g) = T_{ex}\lambda^2/L_e H_e \Omega_g$$

Each transmission 51 and reception 52 antenna has a surface area S corresponding to a gain $$G_e = G_r = 4\pi L_e H_e/\lambda^2 = 4\pi L_r H_r/\lambda^2$$

Since these parameters are fixed, the range status of the radar is determined by the average received power and by the noise level in the receiver:

The average received power $P_{mr}$ can be provided by the formula $$P_{mr} = \frac{P_{me} G_e G_r \lambda^2 \sigma}{(4\pi)^3 R^4 L}$$

or else by expressing the antenna gain as a function of the dimensions of these antennas:

$$P_{mr} = \frac{P_{me}H_eL_eH_rL_r\sigma}{4\pi R^4 L}$$

In the formulae above,
Pe is the transmitted power,
Ge is the antenna gain for transmission,
Gr is the antenna gain for reception,
λ is the wavelength,
σ is the equivalent surface area of the target,
R is the distance of the target,
L is the microwave losses,
$H_e$ is the height of the transmission antenna,
$H_r$ is the height of the reception antenna,
$L_e$ is the width of the transmission antenna,
$L_r$ is the width of the reception antenna.
In the description that follows, the same symbols will represent the same features.
The noise level in the receiver following coherent integration can be provided by the formula $$N = FkT/T_e$$

where:
F is the noise factor of the receiver,
kT is the noise density,
Te is the coherent integration time, which is generally limited by the coherency time of the target
The signal-to-noise ratio at the output of the coherent integration can be provided by the formula:

$$SNR = \frac{P_{mr}T_e}{FkT}$$

At the post-integration output, assuming integration over a number $N_{nc} \# T_{nc}/T_e$, which is typically between 10 and 50, and for a probability of false alarm that is typically less than or equal to $10^{-6}$, the post-integration gain $G_{nc}$ can be approximated for a Swerling fluctuating target 1, or nonfluctuating, using $G_{nc} = N_{nc}^{0.77}$, as shown by the curves shown in FIG. 6.

Under these conditions, the signal-to-noise ratio can be written as follows:

$$SNR = \frac{P_{mr}T_e N_{nc}^{0.77}}{FkT}$$

or by approximating Nnc using Nnc=Tnc/Te $$SNR = \frac{P_{mr}T_e(T_{nc}/T_e)^{0.77}}{FkT}$$

or else, as $T_{nc} = T_{ex}\lambda^2/L_e H_e'\Omega_g$ $$SNR = \frac{P_{mr}T_e}{FkT}\left(\frac{T_{ex}\lambda^2}{LH_e\Omega_g T_e}\right)^{0.77}$$

In order to compare the range status of a radar according to the invention with that of a conventional LPI radar, an embodiment of the invention in which the radiating structure has the same surface area as that of the conventional LPI radar shown in FIG. 5 but in which the transmission and reception areas are distributed differently will be considered. FIG. 7 illustrates an arrangement example for the antenna structure 10 under consideration. The same waveform and the same power transmitted for the two types of radar will be considered. Unlike a conventional LPI radar, the antenna structure 10 of the device 1 according to the invention is not directional for transmission.

This antenna structure comprises K vertical transmission networks of height $N_\lambda$, or 2·N radiating elements spaced by λ/2, transmitting different signals in separate bands ΔF and (M−K') independent vertical reception subnetworks, where K'≥K.

If a particular embodiment in which K'=K is considered, all the available surface area of the antenna structure is taken up by radiating elements, which optimizes the gain for reception.

In other embodiments, there may be reason to limit the number of reception channels, which may result in K'>K being chosen.

The aperture of the transmission antenna according to the invention is provided by the formulae:

in azimuth $\theta_{g3db} = \pi/2$ (radians)

in elevation $\theta_{e3db} = 1/N$ (radians)

The average power received by a radar according to the invention is affected by the decrease in the gain of the transmission antenna in a ratio:

$$\Delta_{ge} = 10\log\left(\frac{\frac{2}{M}\frac{2}{N}}{\frac{\pi}{2}\frac{1}{N}}\right) = 10\log\left(\frac{8}{M\pi}\right)$$

For reception, the antenna gain is increased by the ratio of the surface areas on account of the height of the reception antenna being doubled in relation to a conventional LPI radar. By way of example, taking K=K'=1, the gain of the reception antenna is increased substantially by 3 dB:

$$\Delta_{gr} = +3 \text{ dB}$$

As for the conventional LPI radar, the conditioned radar processing involves integrating the received signal coherently over a time $T_c$ that is limited by the coherence time of the target, typically in the order of 50 ms, and then performing post-integration of the amplitude of the signal over a time $T_{nc}$ that is limited by the time for which the target is present in the beam. The coherent integration time is unchanged.

By contrast, taking account of the aperture of the transmission antenna, on condition that the target remains in the resolution cell of the radar for a sufficiently long time, the post-integration time may be increased in a ratio close to the ratio of the antenna apertures, or M·π/8, which leads to an increase in the post-integration gain close to:

$$\Delta_{gpi} = 7.7\log\left(\frac{M\pi}{8}\right)$$

Finally, the signal-to-noise ratio difference at the output of the radar processing becomes:

$$\Delta SNR = -\Delta_{ge} + \Delta_{gr} + \Delta_{gpi} \text{ or}$$

$$\Delta SNR = 3 - 2.3\log\left(\frac{M\pi}{8}\right)$$

The discretion gain of the radar is evaluated on the basis of the difference in the EIRPs, or:

$$\Delta_{EIRP} = \Delta_{ge} = 10\log\left(\frac{8}{M\pi}\right)$$

These results show that, for values of M in the order of a few dozens, the radar according to the invention exhibits substantially the same range status as a conventional LPI radar. By contrast, the isotropically radiated power thereof is decreased in large proportions.

By way of comparison, the table in Annex 1 shows performance examples for a conventional radar and the performance levels from an exemplary embodiment of a radar according to the invention.

In this example, a classical X-band LPI radar having a field of coverage in azimuth of 90° and an exploration time of 6.4 seconds has been considered. The dimensions of the antenna under consideration are 48 cm height and 60 cm width.

The radar according to the invention comprises only one transmission channel (K=1), and the number of receiving subnetworks is deliberately limited to 32, which corresponds to the case of K'=8 in relation to the number of subnetworks of the LPI radar.

In both cases, a coherent integration time of 30 ms is considered.

Under such conditions, the sensitivity of the radar according to the invention is lower by 2 dB in relation to that of a conventional LPI radar. A loss of 2 dB sensitivity corresponds to a decrease in the radar range in the order of 10%. By contrast, the discretion of the radar according to the invention is increased by 13 dB in relation to the LPI radar under consideration. This means that the interception distance for the radar signal for an ESM device of a given sensitivity is multiplied by a factor of greater than four.

It should be noted that these results can also be improved by using a plurality of transmission channels transmitting signals in bands of separate frequencies, with a difference between these frequency bands no less than or equal to the reception bandwidth of an ESM detector. This case is shown in FIG. 8, for K=4.

Figure 8:
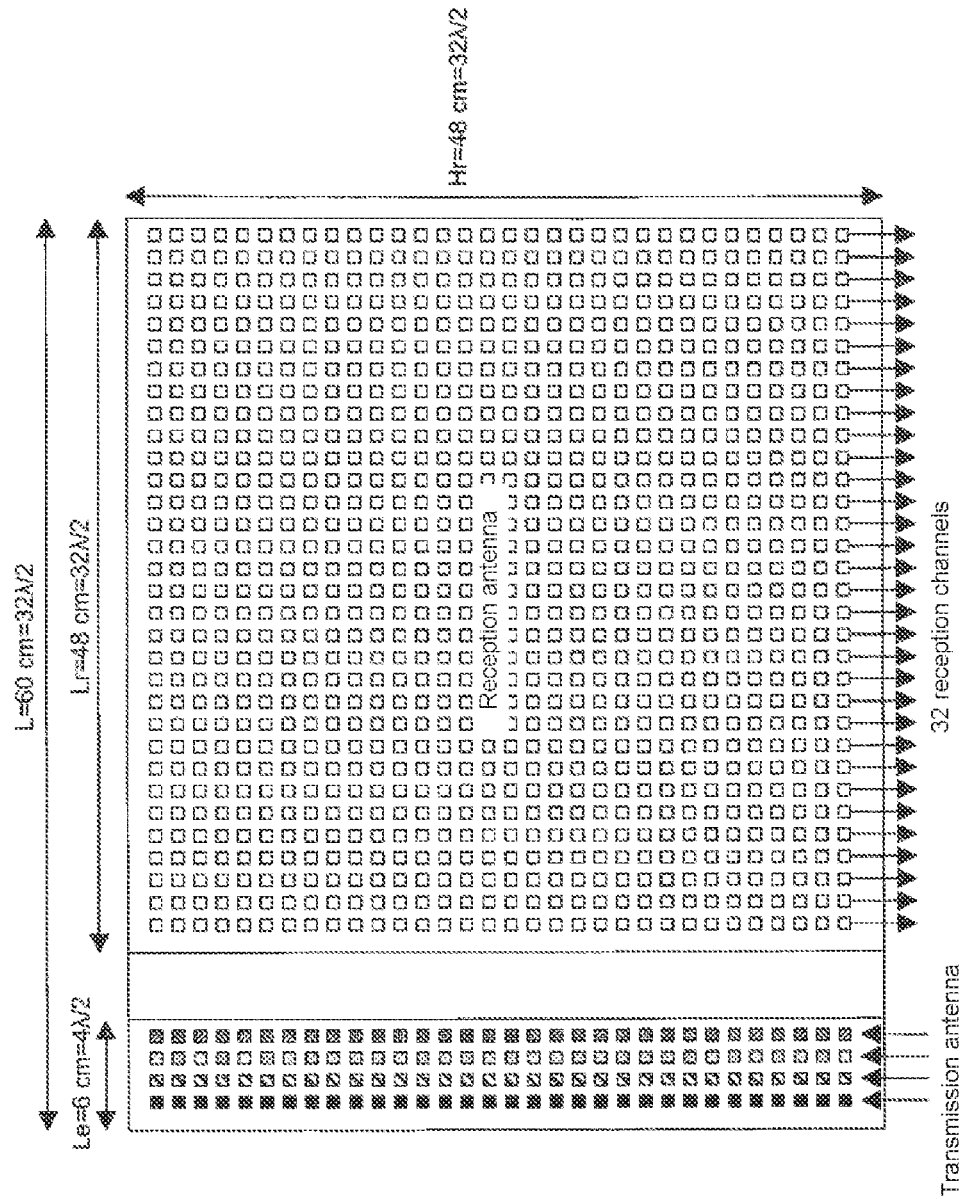
FIG. 8 shows a particular embodiment of an antenna structure having K inputs and M outputs according to the invention.

With reference to FIG. 8, a preferred embodiment of the detection device according to the invention is shown.

In this nonlimiting configuration, the transmission portion of the antenna structure 10 comprises four vertical subnetworks 31 of height Nλ and the reception portion comprises 32 vertical subnetworks 32.

Figure 9:
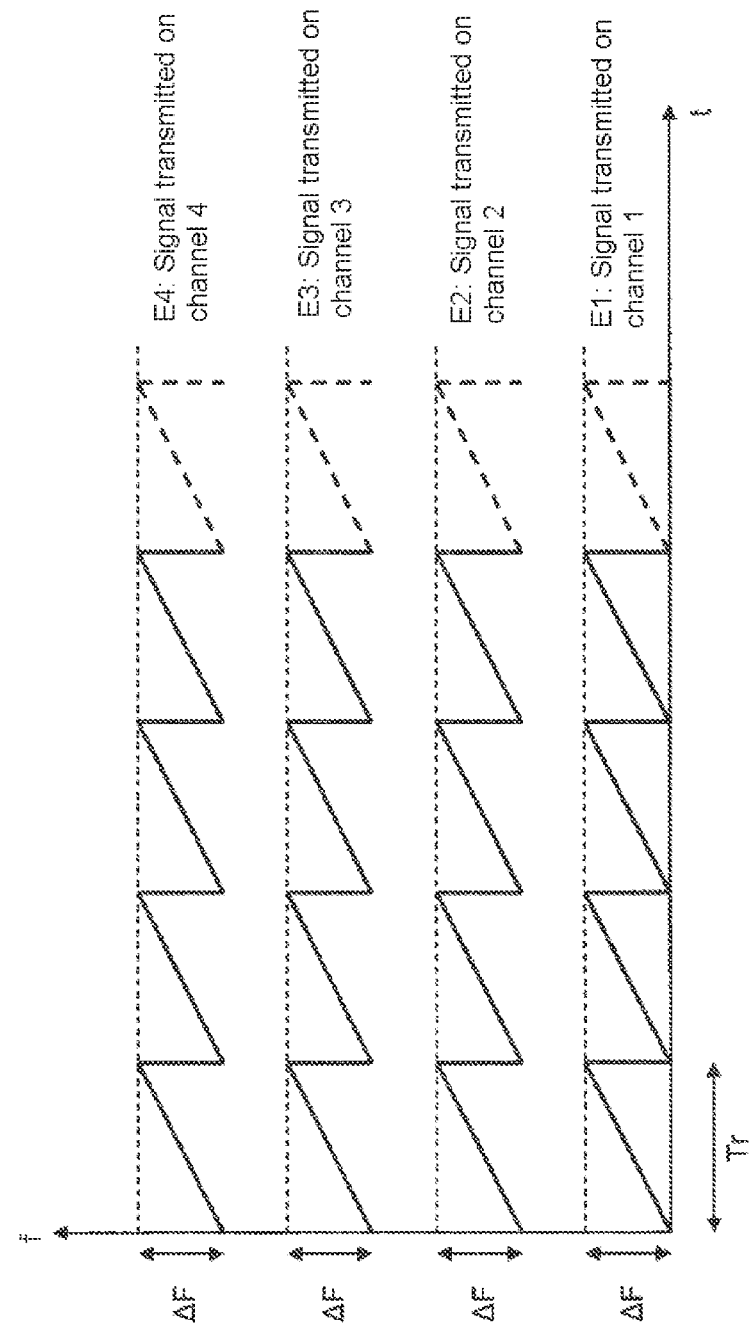
FIG. 9 shows examples of signals transmitted by the detection device according to the invention.

The waveform on transmission is provided by means of four identical signals of FMCW type, for example, but with a frequency spacing by a value greater than or equal to the elementary modulation band, as per the schematic diagram in FIG. 9. The signals are in sync and coherent with one another.

On reception, the signals received on each subnetwork 32 are separated into functions of the transmission subnetworks, for example by means of passband filtering.

Figure 10:
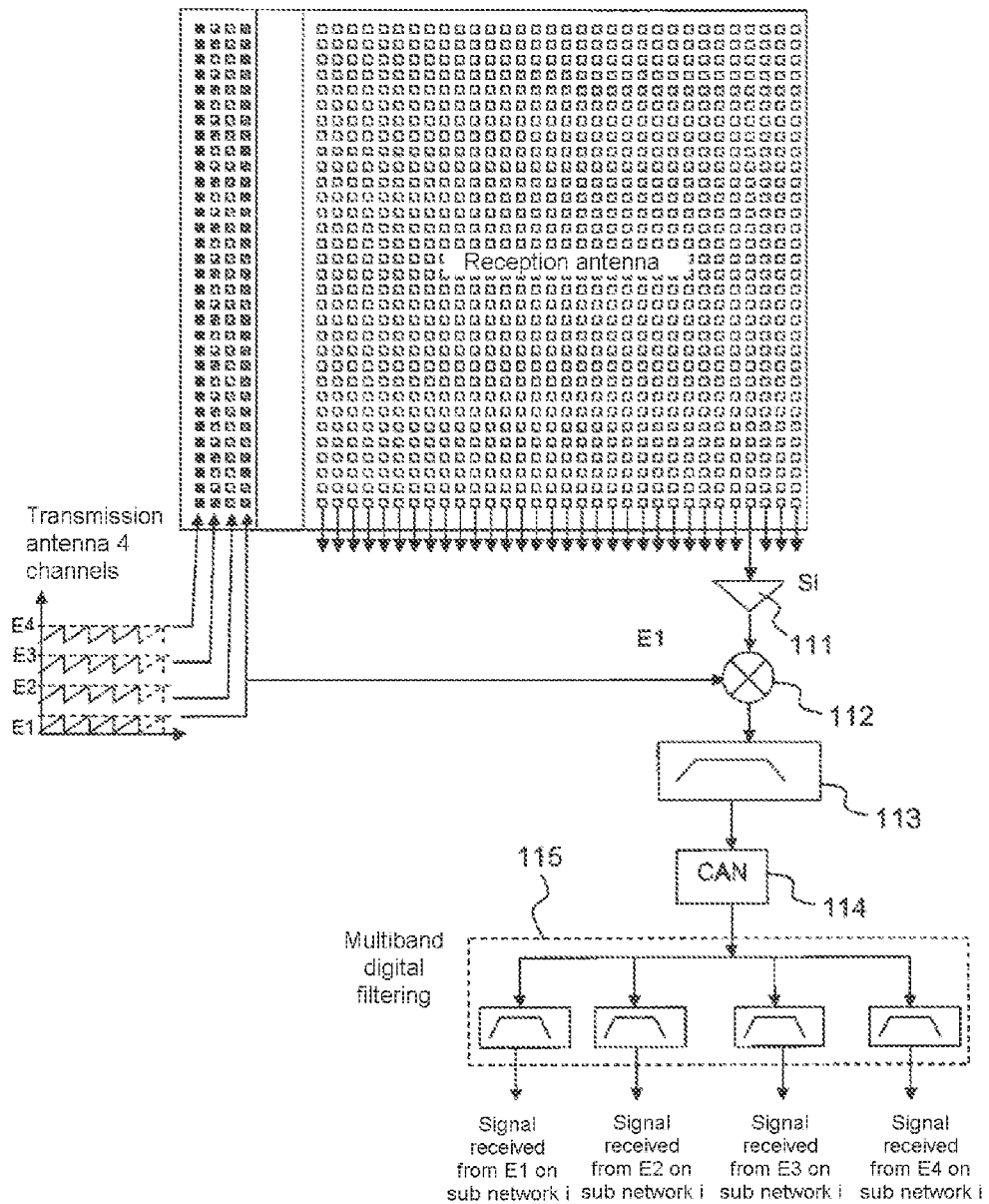
FIG. 10 shows an overview example of separation of the signals received by the detection device.

With reference to FIG. 10, on each reception subnetwork, the signals received are amplified by an amplifier 111 and are then demodulated 112 using one of the transmission signals. Since the transmission signals are identical, apart from the frequency shift, any one of the transmission signals can be chosen for the demodulation. According to another embodiment, the frequency-transposed image of the transmission signal is used for demodulating the reception signals.

Following demodulation, the signals are filtered so as to limit the reception band. By way of example, this filtering 113 can be performed by a passband filter, and the signals are converted to digital using an analog-to-digital converter or CAN 114. The digitized signals are then filtered 115 through passband filters so as to separate the various signals that come from the various transmission subnetworks.

Figure 11:
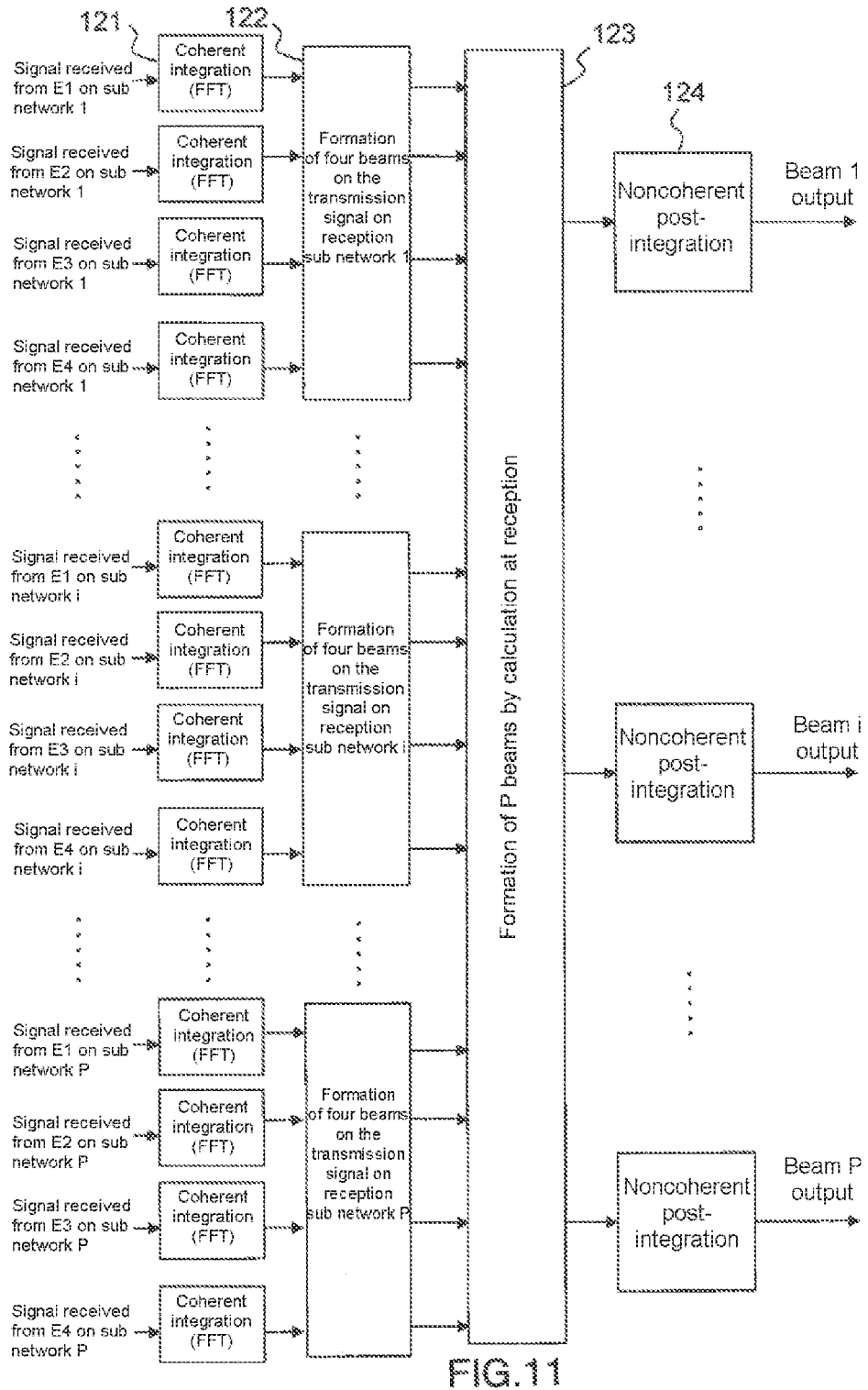
FIG. 11 shows an overview example of the processing following separations of the reception signals.

FIG. 11 shows an overview of operations that can be performed by the reception means following separation of the signals.

For each reception subnetwork, following separation 115, the signals from the various transmitters undergo the classical coherent integration processing with respect to time 121, for example using a fast Fourier transform or FFT. The integration 121 can be performed on the distance axis, on the Doppler axis or on both axes.

In order to refocus the transmission beam, the signals are then summed coherently 122. This amounts to forming four beams on the transmission signal on each reception subnetwork. Formation of beams using the calculation 123 on reception is then performed by summing the reception subnetworks coherently with respect to time and space. This processing 123 is performed on each beam that is formed.

Each beam formed then undergoes noncoherent post-integration 124. The signals of each beam then have their amplitude summed over a certain number of hits.

In relation to a radar that has only one transmission channel, as shown in FIG. 3, for example, with constant total transmitted power, the EIRP of a detection device 1 according to the invention is substantially equal and the detection sensitivity has little modification since, following reflection from the target, the echoes of the signals transmitted by the four channels are summed coherently.

By contrast, with a detection device according to the invention, the EIRP that is apparent in an ESM detector is divided by four, since the energy radiated by the detection device is distributed in four separate ESM reception filters. This reasoning implies that the ESM detector integrates the signal transmitted by the device according to the invention over a maximum band corresponding to the band transmitted by said detection device. As a result, the device according to the invention is more discrete than a conventional LPI radar.

Figure 12:
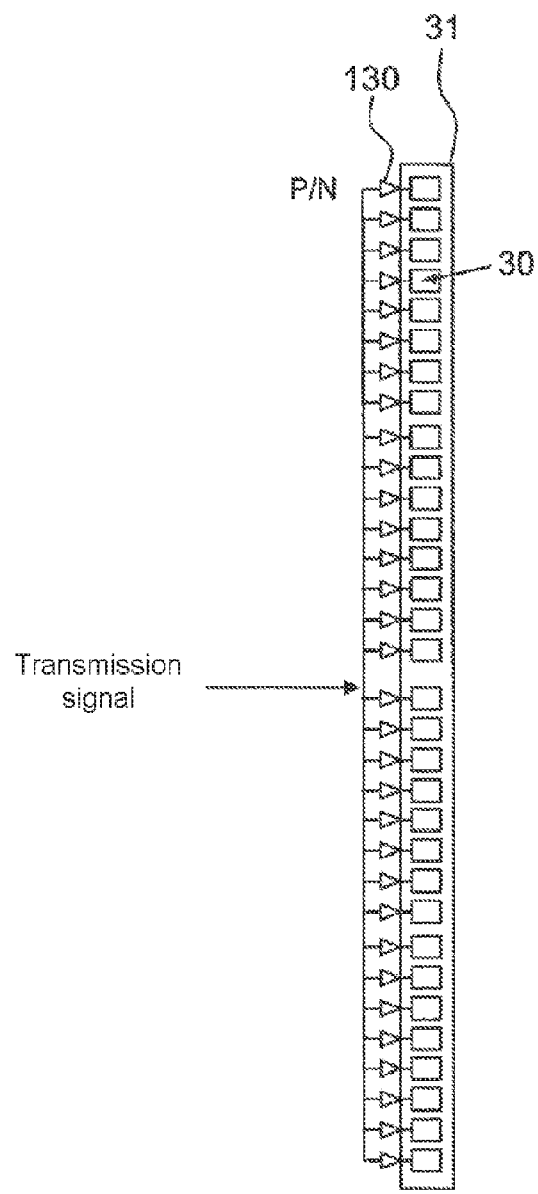
FIG. 12 shows an exemplary embodiment of a transmission subnetwork according to the invention.

According to one embodiment, each radiating element 30 for transmission has a power amplifier 130 or HPA, for high power amplifier, as illustrated in FIG. 12. According to another embodiment, the power amplifier is associated with a group of radiating elements for transmission. Advantageously, by providing or not providing some amplifiers with a supply, or by varying the supply therefor, it is possible to vary the total transmission power. In the same way, it is likewise possible to modulate the aperture in the diagram.

If a transmission subnetwork having N radiating elements is considered, the accessible range with n radiating elements that are active for transmission (m≤N) can be expressed as a function of the maximum range (N active transmitters) as follows:

$$D_n = rD_N \text{ where } r = \sqrt{\frac{n}{N}}$$

If all the radiating elements of the transmitter are working:

$$G_e = \frac{4\pi}{\lambda^2} H_e L_e$$
$$= \frac{4\pi}{\lambda^2}\left(N\frac{\lambda}{2}\right)\left(\frac{\lambda}{2}\right)$$
$$= N\pi$$

$$P_e G_e = P_e N\pi \text{ and}$$

$$D_N = \sqrt[4]{\frac{P_e G_e}{SNR}} = \sqrt[4]{\frac{P_0 N\pi}{SNR}}$$

If only n radiating elements of the transmitter out of N are working, then:

$$G'_e = \frac{4\pi}{\lambda^2} H_e L_e$$
$$= \frac{4\pi}{\lambda^2}\left(n\frac{\lambda}{2}\right)\left(\frac{\lambda}{2}\right)$$
$$= n\pi$$

and therefore $$P'_e G'_e = \left(P_e \frac{n}{N}\right) n\pi$$
$$= P_e \frac{n^2 \pi}{N}$$

and therefore $$D_n = \sqrt[4]{\frac{P'_e G'_e}{SNR}}$$
$$= \sqrt[4]{\frac{P_e n^2 \pi}{SNR \cdot N}}$$

Finally, $D_n$ can be written as a function of $D_N$:

$$D_n = \sqrt[4]{\frac{P_e N\pi}{SNR}} \sqrt[4]{\frac{n^2}{N^2}}$$
$$= D_N \sqrt{\frac{n}{N}}$$

Figure 13:
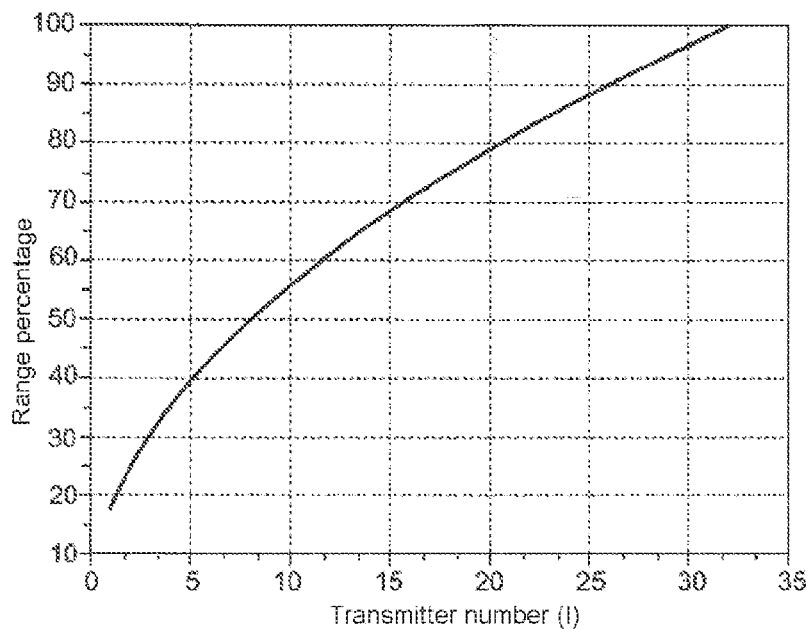
FIG. 13 is a curve that is representative of the range as a function of the number of activated radiating elements.

By way of example, FIG. 13 shows the variation in the radar range as a function of the number of radiating elements of the transmitter that receive a supply.

In order to compare the performance levels of an active radar according to the invention with that of a conventional LPI radar, an X-band radar having the following features is considered:

range of 10 km on a radar cross section or RCS of 1 m², antenna dimensions limited to 60 cm horizontally and to 48 cm vertically,
search field of 90° in azimuth, with an exploration time of 6.4 seconds,
waveform for transmission of an FMCW type.

Dimensioning based on conventional LPI radar features leads to an antenna that comprises a transmission network and a reception network that are identical and superimposed, with dimensions of 60 cm horizontally and 24 cm vertically as illustrated in FIG. 5. This antenna scans the space in azimuth over 90°, transmitting a periodic FMCW continuous waveform with a modulation band of 1 MHz, a modulation period in the order of 1 ms and a transmission power p equal to 1 watt, or 30 dBm. The coherent integration time is in the order of 30 ms, and the noncoherent post-integration time resulting from the aperture of the antenna beam and the exploration time is 200 milliseconds, which allows a post-integration number of 6, corresponding to a post-integration gain in the order of 6 dB.

According to the invention, it is proposed that the same function be performed with a fixed antenna structure comprising, for transmission, four independent subnetworks of height substantially equal to 48 cm, made up of 32 dipoles with a 90° by 90° aperture that are superimposed and at distances of 1.5 cm in the vertical plane.

For reception, the antenna has 32 reception subnetworks that are likewise made up of 32 dipoles with a 90° by 90° aperture that are superimposed and at distances of 1.5 cm in the vertical plane. The signals received on these reception subnetworks are summed coherently in the receiver, using classical beamforming processing.

The antenna structure made up in this manner is similar to that in FIG. 8.

In view of the differences in antenna gain for transmission: −13 dB and for reception: +2 dB, for a constant total transmitted power, the signal-to-noise ratio for each beam formed following coherent integration is decreased by 11 dB in relation to conventional LPI radar. By contrast, the post-integration is performed over a time of 3.2 seconds instead of 200 milliseconds, or using a post-integration number of 104, which gives a post-integration gain of 14.5 dB according to the curve in FIG. 6, or an improvement in the post-integration gain of 8.5 dB.

For constant transmitted power, the sensitivity is therefore decreased by around 2.5 dB. It is possible to compensate for this by increasing the transmission power in a substantially equivalent ratio, by transmitting a total power of 2 watts on the basis of four subnetworks each transmitting 500 milliwatts, or 27 dbm per subnetwork.

Thus, the radar range status is ensured, and the radiated power seen in a reception filter of the interceptor is decreased by 16 dB in relation to a classical LPI radar transmitting the same total power.

For a given ESM interceptor, the interception distance is thus increased in a ratio greater than 6.

The waveform for transmission is implemented, by way of example, with four FMCW signals that are identical to the one transmitted via the reference LPI radar, but which have the frequency spacing with a value greater than the elementary modulation band, as per the schematic diagram in FIG. 9. The frequency modulation band can, by way of example, be chosen to be equal to 1 MHz, and the transmission signals can be shifted with respect to one another by 10 MHz.

Figure 14:
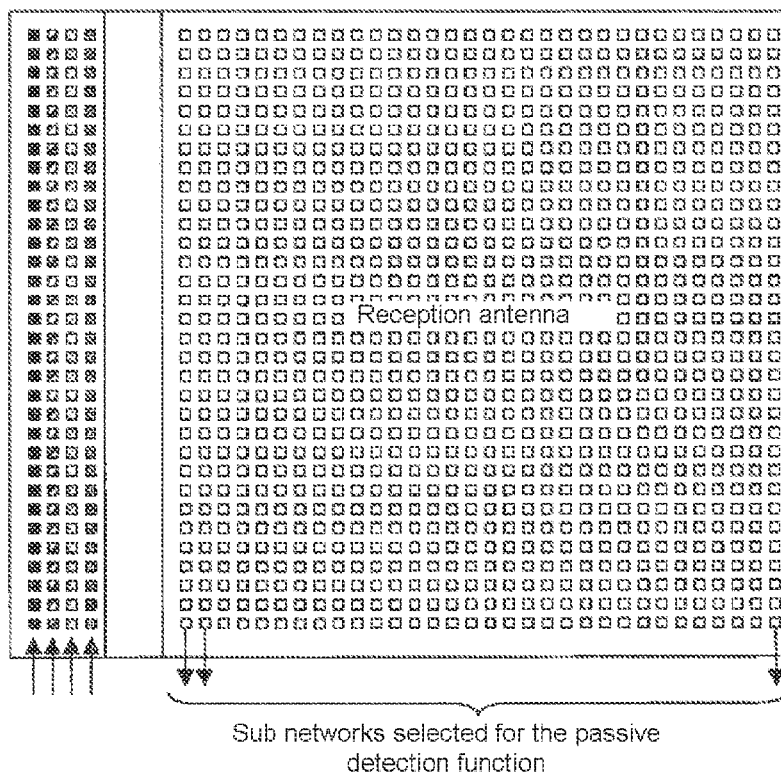
FIG. 14 shows an example of interferometry bases chosen for the ESM function.
Figure 15:
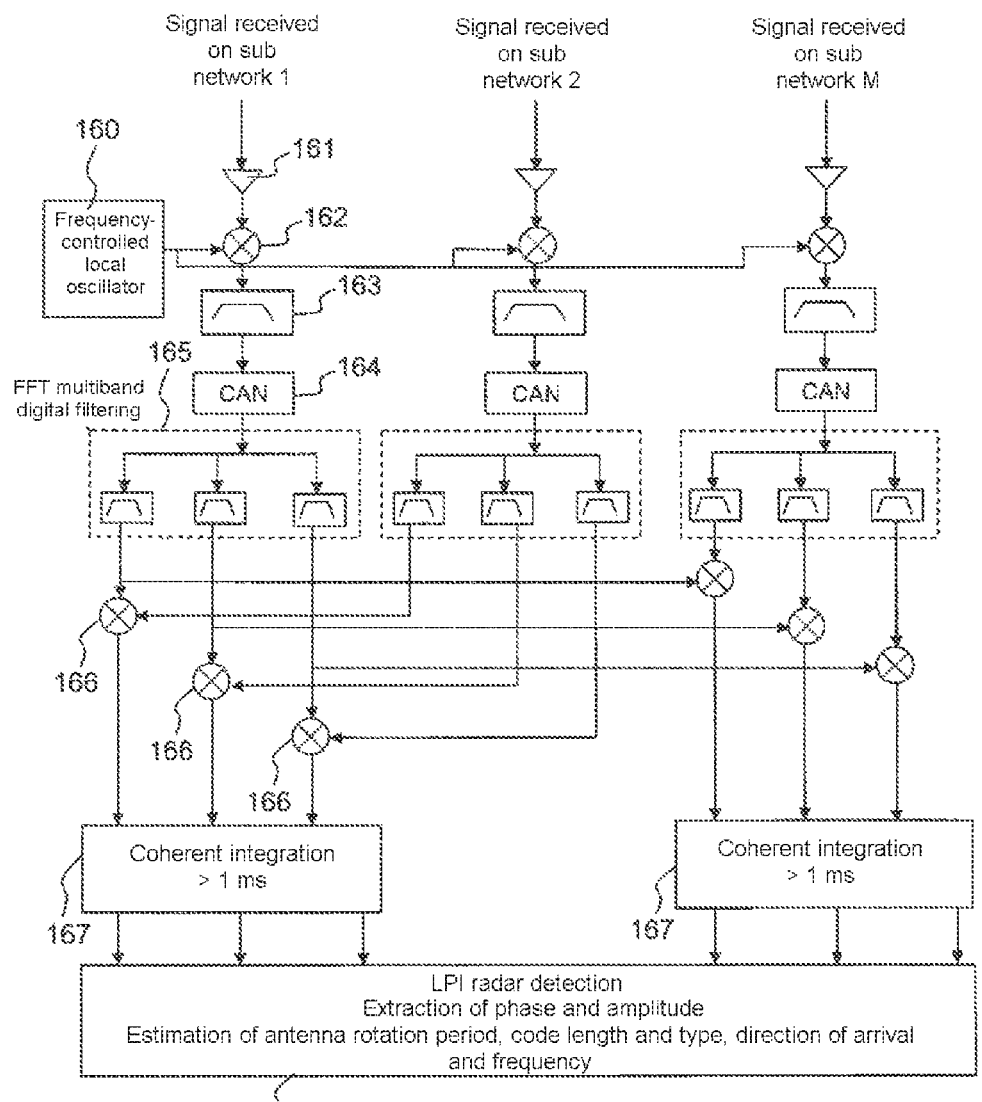
FIG. 15 shows an overview example of processing of the signals received from the passive radar function.

In reference to FIGS. 14 and 15, the operation of the interceptor function in passive or ESM mode will be presented.

The interceptor function in passive mode is performed by using only some of the reception portion of the antenna structure by using the signals received on at least three reception subnetworks 32. The group formed by at least three subnetworks will form an incomplete interferometry system, that is to say a system that does not observe the Shannon conditions over the spatial sampling.

According to a preferred element, the three subnetworks 32 chosen are firstly the two subnetworks 1 and M placed at the two ends of the reception antenna and secondly the immediate neighbor of one of the subnetworks at the ends of the reception antenna. By way of example, FIG. 15 illustrates an embodiment in which the two subnetworks indexed 1, 2 and M are used.

The interferometry system has two bases. In the case of an interferometry system having three subnetworks, a first interferometry base is formed by the two adjacent subnetworks. This base has the special feature of being unambiguous. This is because each subnetwork is spaced by a distance equal to half the wavelength, and it is therefore possible to obtain the direction of arrival of the signal received using the phase measurement. By contrast, since the two subnetworks are adjacent and therefore not very extensive, this base has low precision. The second base is formed by the two subnetworks placed at the two ends of the antenna structure. This second base has very high precision because it is very extensive, but on the other hand it is ambiguous. The use of these two interferometry bases will allow very precise and unambiguous measurements to be obtained for the direction of arrival of the received signal.

This method is effective for a passband in the order of 20% of the central operating frequency of the antenna, typically 2 GHz in the X band.

Of course, it is possible to extend this principle by taking account of a greater number of subnetworks. Advantageously, this allows the ambiguity to be removed more easily, but that makes the system more complex.

According to a particular embodiment, the selection of the reception subnetworks can be modified dynamically, for example at the level of the digital processing, in order to solve the ambiguity problems. This embodiment may be useful when there is a high density of received signals, for example.

FIG. 15 shows an exemplary embodiment of the processing of the ESM function according to the invention.

In this example, the three subnetworks 32 indexed 1, 2 and M as shown in FIG. 14 are considered. Each signal from these three subnetworks following limitation of the reception frequency band is amplified 161 by a low noise amplifier, for example, and then demodulated 162 using a local frequency-controlled oscillator 160. Following demodulation 162, the signals are again filtered 163, for example using a passband filter, so as to reduce the intermediate frequency reception band, and are then digitized 164 using an analog-to-digital converter. The digitized signals are then separated by means of digital filtering 165 into various subbands, and are then intercorrelated in two 186, that is to say between two times two channels of the antenna structure. In the example in FIG. 15, the cross correlation is performed by demodulating the signals from the first subnetwork with those from the second subnetwork and those from the third subnetwork in relation to the signals from the first subnetwork. Of course, this method can be generalized in the event of there being more subnetworks. The signals then undergo a step of coherent integration 167 over a long time, typically in the order of approximately 1 ms, before classical processing 168 of radar detection and extraction of the parameters from this or these detected target radar(s).

With reference to FIG. 14, a particular embodiment in which the ESM function uses three of the subnetworks 32 of the antenna structure is considered.

The antenna gain of each subnetwork can be estimated at 17 dB and the noise factor F can be estimated at 5 dB. The intermediate frequency passband is 100 MHz, for example.

If three bandwidths for reception: $B_{FI}$=50 Mhz, 12.5 Mhz and 781 kHz are fixed for the multiband digital filtering, the noise level in each of these subbands can be evaluated at:

$$N = F + 10 \log(B_{FI}) + 10 \log(kT)$$

For kT=−174 dBm/Hz, the following are respectively obtained for each bandwidth of the reception filters: N=−92 dBm, −98 dBm and −110 dBm.

Moreover, the video band Bv corresponding to a period of 1 ms of coherent integration is 1 kHz.

Let us assume 3 dB of processing losses prior to the intercorrelation and 3 dB of losses likewise after intercorrelation, and a signal-to-noise ratio that is necessary for detection of SNRs=18 dB. Under these conditions, the signal-to-noise ratio that is necessary at the input of the interceptor in order to exceed the detection threshold can be estimated on the basis of the following equation:

$$SNRs = \frac{\left(\frac{SNR_e}{2}\right)^2}{1 + SNR_e} \frac{B_{FI}}{2Bv} \approx \left(\frac{SNR_e}{2}\right)^2 \frac{B_{FI}}{2B_v}$$

which gives:

$$SNR_e = 2\sqrt{SNR_s 2 \frac{B_v}{B_{FI}}}$$

or in dB:

$$SNR_e(dB) = 3 + \frac{SNR_s(dB)}{2} + 5\log(2) + 5\log\left(\frac{B_v}{B_{FI}}\right)$$

This results in a signal-to-noise ratio that is respectively equal to:

$$SNR_e(dB) = -10 \text{ dB}, -7 \text{ dB and } -1 \text{ dB}$$

or in a minimum signal level at the input of the receiver $S_{min}$ that is respectively equal to: −120 dBm, −105 dBm and −93 dBm.

Taking account of the antenna gain of 17 dB for each receiving subnetwork, a sensitivity of −137 dBmi, −122 dBmi or −110 dBmi, respectively, is obtained for the three reception bandwidths.

These sensitivity levels are far higher than the usual values of the interception systems, and allow the detection of LPI radars at a very great distance. By way of example, an X-band radar transmitting a power of 1 milliwatt with an antenna gain of 25 dB generates an isotropically radiated power density at 10 km in the order of −107 dBm at the antenna of the interceptor.

If the overview in FIG. 15 is compared with that in FIGS. 10 and 11, it will be noted that the overview of the passive radar function can be integrated into that of the active radar function. The circuits used for reception can therefore be shared by the active radar and passive radar functions. Advantageously, this allows the architecture of the detection device according to the invention to be simplified and the volume of the electronics that need to be implemented to be minimized.

Figure 16:
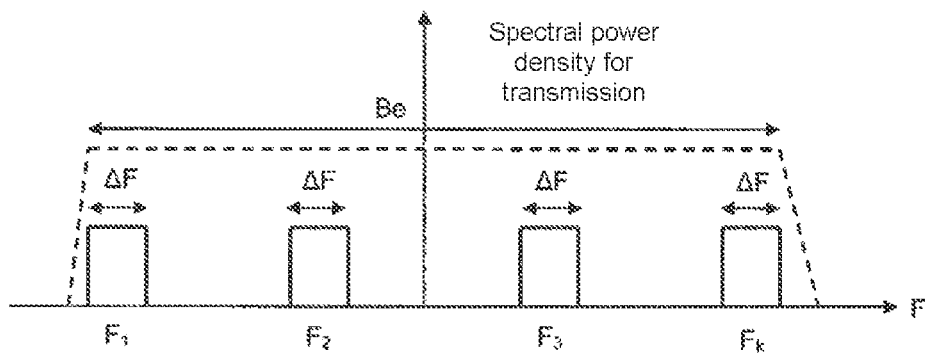
FIG. 16 shows an example of spectral distribution of the transmission signals.

FIG. 16 shows an examplary embodiment of a detection device 1 according to the invention that integrates both the active radar function and the passive radar or ESM function.

In active mode, the radar function uses the transmission and reception portions of the antenna structure and the transmission and reception means of the detection device 1 according to the invention.

The transmission means comprise at least K waveform generators 191 that are driven by one and the same drive synchronization circuit 192. The waveform generators 191 generate transmission signals of identical shape that are centered on different frequencies and occupy separate frequency bands. Preferably, the signals are periodic frequency modulated continuous signals (FMCW) that are frequency shifted in relation to one another as illustrated in FIG. 8. The various transmission signals all have the same modulation band $\Delta F$ and are centered on the frequencies $F_1$ to $F_k$. The set of transmission signals covers a frequency band of width Be as illustrated in FIG. 14.

On reception, the signals from one of the generators 192 used for transmission, for example the $K^{th}$, are frequency-transposed in a single sideband mixer 193 (SS) by the frequency signal FI at the output of the drive oscillator 191, so as to generate a waveform centered on $FI+F_k$ or $FI-F_k$ that will be used to demodulate the received signal.

The signal received at a reception subnetwork 32 comprises K components, of bandwidth $\Delta F$, and respectively centered on the frequencies $F_1$ to $F_k$.

Figure 17:
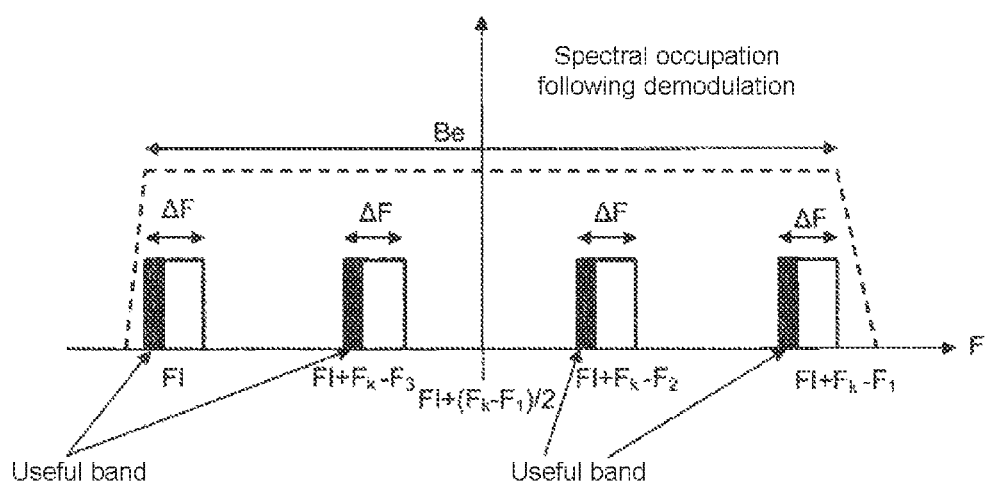
FIG. 17 shows an example of spectral occupation of the signals received following demodulation.
Figure 18:
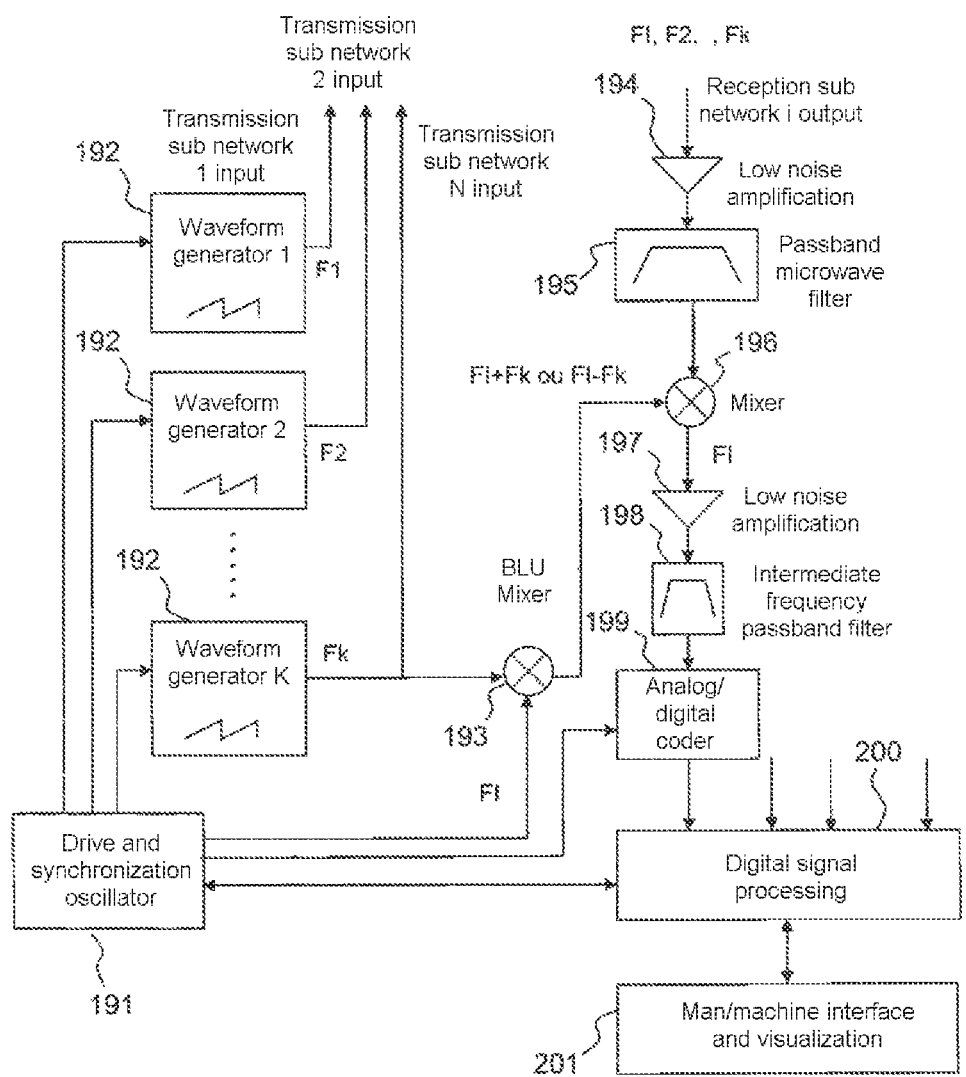
FIG. 18 shows an overview example of processing of the signals received in a mode with the active radar and passive radar functions integrated.

Following demodulation, for example using a mixer 196, the various components of the signal are centered on $F_I-F_1+F_K$, $F_I-F_2+F_K$, $F_I$, and each occupy a frequency band $\Delta F$, the set covering a band Be, as illustrated in FIG. 17.

With reference to FIG. 17, it should be noted that only a limited portion of each subband corresponds to the useful signal. The reason is that, according to the principle of FMCW radar, if the duration of the frequency ramp is T and the maximum instrumented distance Dmax, the maximum beat frequency between the transmitted signal and received the signal is:

$$2D\text{max}\Delta F/cT,$$

where c is the speed of light, with $2D\text{max}/cT \ll 1$

By way of example, Dmax=10 km and T=1 ms, 2Dmax/cT=0.066, and the useful band is $0.066\Delta F$.

The signals are then filtered in a passband filter 198 having a passband greater than or equal to Be, which is tuned to the central frequency $FI+(F_k-F_1)/2$, and are then digitized 199 using a sampling frequency of greater than or equal to 2Be. The separation of the signals corresponding to the various transmission signals is performed at the level of the digital processing by means of digital filtering 200 around each subband of interest.

In passive mode, only the reception means and the reception portion of the antenna structure 10 are used.

In this mode, only one waveform generator 192 is active, for example the $k^{th}$. The signals at the output of this waveform generator are used to demodulate the received signal from the radar transmitters that are present in the beam from the reception antenna of the interceptor. The passband of the receiver is limited and the waveform generator 192 is driven in terms of frequency so as to scan the frequency domain to be analyzed.

Advantageously, the detection device according to the invention, by integrating the two active and passive radar functions, allows the cost, volume and mass of said detection device to be optimized.

Since the antenna of the device is fixed, there is no noise generation related to the rotation mechanisms, which strengthens the acoustic discretion of the system. Moreover, said antenna does not require a rotary joint between the aerial and the receiver, which allows the elimination of a constraint, such as when the signals to be transmitted are wideband.

Since the device is fixed, the coverage of the whole of the angular field to be surveyed can be effected instantaneously, which benefits the probability of interception and reduces the acquisition time. Equally, the absence of servomechanisms results in better reliability in relation to other existing systems.

In view of beam agility, waveform and frequency capabilities together, the system has very low sensitivity to jamming, whether intentional or not.

In the case of a fixed antenna with planar faces, the probability of undergoing specular lighting is reduced, which considerably limits the radar cross section of the antenna and strengthens the electromagnetic discretion of the system.

On the other hand, the device according to the invention can be used in an enormous field of applications, other than electromagnetic interception, such as deck-lining assistance for a helicopter or else docking assistance or assistance in refueling for a ship. Advantageously, it can likewise be used as a passive radar by using opportunity transmissions or in collaboration with one or more radiation sources.

| Annex 1 | | |
|---|---|---|
| Conventional LPI radar | Number of sub networks in azimuth M | 40 |
| | Antenna length in azimuth (cm) | 60 |
| | Number of sub networks in elevation N | 16 |
| | Antenna aperture in azimuth (rd) | 0.05 |
| | Antenna aperture in elevation (rd) | 0.13 |
| | Antenna gain | 30.03 |
| | Time present in the lobe (sec) | 0.20 |
| | Number of post-integration points | 6 |
| | Post-integration gain (db) | 5.99 |
| LPI radar according to the invention | Number of sub networks in azimuth, transmission antenna | 1 |
| | Antenna sub network length in azimuth (cm) | 1.5 |
| | Antenna sub network aperture in azimuth (rd) | 1.57 |
| | Transmission antenna gain | 17.02 |
| | Number of sub networks in elevation | 32.00 |
| | Antenna aperture elevation (rd) | 0.06 |
| | Number of sub networks in azimuth, reception antenna | 32.00 |
| | Time present in the lobe (sec) | 3.21 |
| | Number of post-integration points | 107 |
| | Post-integration gain (db) | 15.03 |
| | Additional LPI post-integration gain | 9.03 |
| | Loss of transmission gain/LPI | −13.01 |
| | Additional reception azimuthal gain | 2.04 |
| | Sensitivity status (db) | −1.93 |
| | Discretion status (db) | −13.01 |

The invention claimed is:

1. An active and passive electromagnetic detection device with a low probability of interception having a fixed antenna structure, transmission means and reception means, in which:

the antenna structure is formed by a plurality of radiating elements grouped into identical subnetworks and comprises at least one transmission subnetwork and at least three reception subnetworks that are separate from the transmission subnetworks, the transmission means are configured for generating an unfocused continuous or quasi-continuous waveform having low peak power in one plane and of transmitting said waveform via the transmission subnetwork(s), the reception means are configured for detecting the targets following formation of a plurality of directional beams on the basis of the signals received on the reception subnetworks of the antenna structure, the reception means are likewise configured for implementing the interception of radar signals from other radar sources by means of cross correlation processing between the signals received on at least three reception subnetworks, the group formed by at least three reception subnetworks implementing an incomplete interferometry system.

2. The device as claimed in claim 1, in which the antenna structure comprises at least two transmission subnetworks and the transmission means are configured for generating signals having different frequency bands and of transmitting these signals on different transmission subnetworks.

3. The device as claimed in claim 1 in which the transmission means are configured for generating transmission signals of identical shape that are centered on different frequencies and occupy separate frequency bands.

4. The device as claimed in claim 1 in which the transmission signals are of continuous or quasi-continuous shape and frequency modulated.

5. The device as claimed in claim 1 in which the reception means are configured for demodulating the received signals using one of the transmission signals.

6. The device as claimed in claim 1, in which the reception means are configured for demodulating the received signals using one of the transmission signals following frequency transposition of said transmission signal.

7. The device as claimed in claim 1, in which the antenna structure comprises at least two transmission subnetworks, the transmission means are configured for generating signals having different frequency bands and for transmitting these signals on different transmission subnetworks and in which the reception means are configured for separating the received signals, following demodulation, into reception subsignals using passband filtering, said filtering being performed as a function of the transmission signals.

8. The device as claimed in claim 7, in which the reception means are configured for coherently integrating the various reception signals with respect to time, the integration of each subsignal being performed separately.

9. The device as claimed in claim 7 in which the reception means are configured for integrating the reception subsignals with respect to space and coherently so as to form directional beams in one plane.

10. The device as claimed in claim 7, in which the reception means are configured for integrating the reception subsignals with respect to space and coherently so as to form directional beams in one plane and in which following coherent integration with respect to time and space, the reception means are configured for post-integrating the reception subsignals noncoherently throughout the time available for exploring the angular field to be covered.

11. The device as claimed in claim 7, in which:

the reception means are configured for integrating the reception subsignals with respect to space and coherently so as to form directional beams in one plane, following coherent integration with respect to time and space, the reception means are configured for post-integrating the reception subsignals noncoherently throughout the time available for exploring the angular field to be covered, the reception means are capable of configured for detecting the potential targets in each beam formed following noncoherent post-integration.

12. The device as claimed in claim 1 in which the transmission means have means that are configured for adjusting the minimum transmitted power as a function of the instrumented range and the radar cross section to be detected.

13. The device as claimed in claim 1 in which the reception means are configured, in passive mode, for performing intercorrelation of the signals received on at least three reception subnetworks so as to detect and locate, in angular fashion, the potential transmission sources.

14. The device as claimed in claim 13, in which the reception means are configured for performing angular location of the potential radar transmission sources using phase interferometry, the reception subnetworks used forming at least a first, ambiguous interferometry base and a second, unambiguous interferometry base.

15. The device as claimed in claim 13, in which the reception means are configured for performing angular location of the potential radar transmission sources using phase interferometry, the reception subnetworks used forming at least a first, ambiguous interferometry base and a second, unambiguous interferometry base, said interferometry bases are formed by three reception subnetworks, two being situated at each of the two ends of the antenna structure and the third being the neighbor closest to one of the two preceding reception subnetworks.

16. The device as claimed in claim 1 in which the reception means have selection means that are configured for selecting the subnetworks to be used for detection and location in differentiated fashion over the course of time so as to separate the received signals and remove the angular ambiguities in a dense electromagnetic environment.

17. The device as claimed in claim 1 in which it comprises n antenna structures, where n>=3, each structure covering an angular field that is substantially equal to 360°/n and each structure being disposed on each of the lateral faces of a polyhedron having an n-sided polygonal base so as to cover an angular field that is substantially equal to 360°.

* * * * *